(12) United States Patent
Van Amstel et al.

(10) Patent No.: US 11,172,618 B2
(45) Date of Patent: Nov. 16, 2021

(54) BALER AND METHOD OF BALING

(71) Applicant: KUHN-GELDROP BV, Geldrop (NL)

(72) Inventors: LeonardUs Hendricus Maria Van Amstel, Geldrop (NL); Dionisius Cornelis Maria Akkermans, Roosendaal (NL)

(73) Assignee: KUHN-GELDROP BV, Geldrop (NL)

( * ) Notice: Subject to any disclaimer, the term of this patent is extended or adjusted under 35 U.S.C. 154(b) by 123 days.

(21) Appl. No.: 16/813,310

(22) Filed: Mar. 9, 2020

(65) Prior Publication Data

US 2020/0214218 A1 Jul. 9, 2020

Related U.S. Application Data

(63) Continuation of application No. 14/238,994, filed as application No. PCT/EP2012/004086 on Sep. 28, 2012, now Pat. No. 10,609,869.

(30) Foreign Application Priority Data

Sep. 29, 2011 (GB) .................................... 1116839

(51) Int. Cl.
*A01F 15/08* (2006.01)
*B30B 9/30* (2006.01)
*A01F 15/04* (2006.01)

(52) U.S. Cl.
CPC .......... *A01F 15/0825* (2013.01); *A01F 15/04* (2013.01); *A01F 15/0841* (2013.01); *B30B 9/3007* (2013.01)

(58) Field of Classification Search
CPC .. A01F 15/04; A01F 15/0825; A01F 15/0841; B30B 9/3003; B30B 1/06;
(Continued)

(56) References Cited

U.S. PATENT DOCUMENTS 4,624,180 A 11/1986 Strosser
4,626,180 A * 12/1986 Tagawa ................. F04C 29/025
418/63

(Continued)

FOREIGN PATENT DOCUMENTS

DE 91 08 469 U1 9/1991
EP 0 223 351 A1 5/1987
(Continued)

OTHER PUBLICATIONS

International Search Report dated Feb. 1, 2013, in PCT/EP12/004086 filed Sep. 28, 2012.

*Primary Examiner* — Edward T Tolan
*Assistant Examiner* — Jared O Brown
(74) *Attorney, Agent, or Firm* — Oblon, McClelland, Maier & Neustadt, L.L.P.

(57) ABSTRACT

A baler is provided, including a baling chamber that includes a bale-forming channel including at least one adjustable friction control element; a plunger mounted within the channel; a rotary drive mechanism to drive reciprocating movement of the plunger; a control system to control operation of the baler and being configured to determine an actual maximum torque value (MTV) associated with the mechanism, to compare the actual MTV with a selected desired MTV, and to adjust the control element to regulate the actual MTV according to the selected desired MTV; a sensor that senses a force value; and a sensor that senses a cyclical position of a component of the mechanism, the control system being further configured to determine the actual MTV by measuring the force value, sensing the cyclical position of the component, and deriving the actual MTV from the measured force value and the sensed cyclical position.

6 Claims, 3 Drawing Sheets

(58) Field of Classification Search
CPC ... B30B 1/26; B30B 1/266; B30B 15/14; B30B 15/281
See application file for complete search history.

(56) References Cited

U.S. PATENT DOCUMENTS

| | | | |
|---|---|---|---|
| 6,101,932 A * | 8/2000 | Wilkens | A01F 15/0825 100/192 |
| 6,161,368 A | 12/2000 | Wilkens | |
| 6,457,405 B1 * | 10/2002 | Lippens | A01F 15/0825 100/192 |
| 2010/0036569 A1 * | 2/2010 | Hel | A01B 61/025 701/50 |

FOREIGN PATENT DOCUMENTS

| | | |
|---|---|---|
| EP | 0 346 586 A2 | 12/1989 |
| EP | 1 516 526 A1 | 3/2005 |

\* cited by examiner

BALER AND METHOD OF BALING

CROSS-REFERENCE TO RELATED APPLICATIONS

This application is a continuation application of and claims the benefit of priority under 35 U.S.C. § 120 from U.S. application Ser. No. 14/238,994, filed Feb. 14, 2014, which is a U.S. national stage application of PCT/EP2012/004086, filed Sep. 28, 2012, and which claims benefit of priority under 35 U.S.C. § 119 from U.K. Application No. 1116839.0, filed Sep. 29, 2011, the entire contents of each of which are incorporated herein by reference.

The present invention relates to a baler and a method of baling, in particular but not exclusively for baling an agricultural crop.

For efficient transport and storage, agricultural products like hay, straw and silage may be compressed into bales of a parallelepiped shape, which are known as 'square' bales. After compression of the bale material the shape and the compression of the bale is maintained by binding the bale with twines that are looped around the compressed bale material. The ends of the twine are then knotted together.

Typically, compression of the bale material is performed by a reciprocating plunger press baler. A typical baler of this type is described in U.S. Pat. Nos. 4,074,623 and 4,142,746 to Hesston Corporation. This baler machine is somewhat similar to the baler shown in FIG. 1, which includes a baling chamber C comprising an open ended channel through which bale material is forced by a reciprocating plunger D. The plunger is driven in a substantially linear direction L between two end positions comprising respectively a withdrawn position in front of the baling chamber and an extended position in which it extends into the baling chamber. When the plunger is in the withdrawn position the baling chamber is loaded with the bale material to be compressed. The plunger is then driven into the baling chamber so that this new material is compressed against a body of compressed material 1 already in the baling chamber. Any newly compacted material that is added to the already compacted material in the channel is called a 'wad' W. The friction of the compressed material with the walls of the baling chamber channel provides a resistive force allowing for compression of the new material that is introduced into the baling chamber C in front of the plunger D.

After compression, the newly compressed material and the compressed material already in the baling chamber are moved together towards the outlet end of the baling chamber until the plunger reaches its fully extended end position. The plunger then moves in the opposite direction towards its withdrawn position so that the baling chamber can be reloaded with new material to be compressed.

During the compression stroke, the force exerted by the plunger increases as the bale material is compressed and typically reaches a maximum value at the moment when the newly entered bale material has been compressed and the bale material already in the channel starts to shift towards the outlet end of the baling chamber. The maximum value of the plunger force thus depends on the level of friction between the compressed material and the sides of the baling chamber.

The friction within the baling chamber between the compressed material and the sides of the chamber can be regulated by pressing the side panels and/or the top panel of the baling chamber against the compressed material with different levels of force F. To avoid damaging the machine, the desired maximum plunger force should not exceed a set value determined by the mechanical design of the machine, but may typically range from, for example, 10% to 100% of the maximum designed plunger force of the baling machine, depending on the required degree of compression.

It is known for instance from DE9108469U and EP0223351 that the forces F on the side panels and/or top panel of the channel can be regulated as a function of the measured plunger force P. During operation the operator may select a set point for the desired maximum plunger force. During baling, a control unit adjusts the force F on the side/top panels of the channel so that the actual measured plunger force is as close as possible to the desired set point. With such a regulation system the actual plunger force is constant and is unaffected by the changing friction characteristics of the bale material in the channel.

The actual plunger force can be measured or determined in various ways including, for example, by measuring directly the force on the plunger rod with a strain gauge, or by measuring the force on the connecting parts of the driveline X, or by measuring the reaction force between main gearbox 5 (including the crank 8) and a frame 7 of the baler.

The maximum designed plunger force of the baling machine is usually limited by the maximum allowable drive torque of the main gearbox 5 during an average plunger stroke.

However, in practice the maximum actual drive torque transmitted through the gearbox does not depend solely on the maximum plunger force. Instead, as illustrated in FIG. 2, for a given maximum drive torque the maximum plunger force is dependent on the position of the crank 8 and the size of the angle A between the crank 8 and the plunger rod 3. For example, given a maximum torque of 90.000 Nm and a crank length of 360 mm, the maximum plunger force when the angle A is about 90 degrees will be about 250.000 N. However, when the angle A is 160 degrees the maximum plunger force at the same torque will be about 750.000 N.

As mentioned above, during the compression stroke the force exerted by the plunger increases as the bale material is compressed and typically reaches a maximum value at the moment when the newly entered bale material has been compressed and the bale material already in the channel starts to shift backwards towards the outlet end of the baling chamber. At this point, the plunger is at a distance about equal to the wad thickness d from the fully extended end position of the plunger. The maximum torque experienced by the gearbox during the compression stroke thus depends on the wad thickness. However, the wad thickness d is dependent both on the amount of material loaded in front of the plunger and on the physical properties of the material. The known regulation process in which the positions of the side/top panels is based on the plunger force may lead to overloading of the gearbox, for example when compressing large wads of bale material, or it can result in the maximum allowable torque of the gearbox not being fully utilized, for example when compressing small wads of bale material. Regulating the biasing force applied to the side/top panel force based on the plunger force will lead to the same problems and disadvantages.

It is an object of the present invention to provide a baler and a method of baling that mitigates the aforesaid disadvantages.

According to one aspect of the present invention there is provided a method of baling using a square baler comprising a bale-forming channel having at least one adjustable friction control element, a plunger mounted within the channel and a rotary drive mechanism for driving reciprocating movement of the plunger, the method comprising determining an actual maximum torque value (MTV) associated with the rotary drive mechanism, comparing the actual MTV with a selected desired MTV and adjusting the friction control element to regulate the actual MTV according to the desired MTV.

Therefore, in the present invention the friction control element (for example, an adjustable panel of the bale channel) is adjusted according to (at least) the actual maximum torque value (MTV) of the rotary drive, instead of (or in addition to) the maximum plunger force. This avoids the problems described above, which result from the fact that the plunger force varies with the position of the crank arm of the drive mechanism.

Advantageously, the actual MTV is regulated so as not to exceed the desired MTV. As a result, it is possible to reduce the risk of overloading the gearbox.

Advantageously, the actual MTV is matched to the desired MTV. As a result, it is possible to utilize the maximum allowable torque of the gearbox without the risk of overloading the gearbox. This also provides the advantage that the operator can choose either (i) a high throughput for the baling machine, which will produce large loads for the plunger, thick wads and a low plunger force, so resulting in a lower density for the bale, or (ii) a reduced throughput for the baling machine producing reduced loads on the plunger and thinner wads, and resulting in higher plunger forces and a higher density of the bales.

The phrase "the actual MTV is matched to the desired MTV" as used herein means that the friction control element is adjusted to reduce any difference between the actual MTV and the desired MTV. In an ideal situation the difference between the actual MTV to the desired MTV will be reduced so that it is substantially equal to, or close to, zero. However, this is not an absolute requirement. In many cases it will be sufficient for the difference to be reduced to less than a certain proportion, for example 20%, of the desired MTV.

The actual MTV may be determined directly by measuring a torque value within the rotary drive mechanism. For example, the actual MTV may be determined by measuring a torque value within an input drive shaft or an output drive shaft of the rotary drive mechanism.

Alternatively, the actual MTV may be determined indirectly by measuring a force value, for example the plunger force, and simultaneously sensing the cyclical position of a component of the rotary drive mechanism, for example the crank arm, and deriving the actual MTV from the measured force value and the sensed cyclical position. The actual MTV may thus be derived by combining these two values. For example, the actual MTV may be determined by measuring the drive force between rotary drive mechanism and the plunger, or between rotary drive mechanism and a frame of the baler. The sensed cyclical position may for example be the position of the output drive shaft of the rotary drive mechanism.

Advantageously, determining an actual MTV associated with the rotary drive mechanism comprises determining a maximum torque value during a compression stroke of the plunger.

Alternatively, the actual MTV may be determined by measuring a maximum force value, sensing a travel distance of compressed material in the bale chamber during the compression stoke, and deriving the actual MTV from the measured force value and the sensed travel distance, as the travel distance (=wad thickness) is directly related to the angle of the crank at the point where the maximum force is exerted.

Advantageously, the adjustable friction control element comprises an adjustable panel of the bale-forming channel. Alternatively, the friction control element may consist of a separate element, for example one or more friction bars, mounted within the channel. Advantageously, adjusting the friction control element comprises adjusting a bias force applied to the friction control element.

In one embodiment, the friction control element is adjusted according to a direct comparison of the actual MTV and the desired MTV.

In another embodiment, the method further comprises measuring an actual force value, comparing the actual force value with a selected desired force value and adjusting the friction control element to ensure that the actual force value does not exceed the desired force value.

In this way the risk of overloading other components of the baling machine can be avoided. Advantageously, the method includes calculating from the sensed MTV an actual maximum force value, comparing the actual maximum force value with the desired force value and adjusting the friction control element to match the actual maximum force value to the desired maximum force value.

Advantageously, the method includes determining an accumulated torque value from a plurality of actual MTV values, and adjusting the desired actual MTV according to the value of the accumulated torque value.

According to another aspect of the invention there is provided a baler comprising a bale-forming channel having at least one adjustable friction control element, a plunger mounted within the channel and a rotary drive mechanism for driving reciprocating movement of the plunger, and a control system for controlling operation of the baler, the control system being configured to determine an actual MTV associated with the rotary drive mechanism, to compare the actual MTV with a selected desired MTV and to adjust the friction control element to regulate the actual MTV according to the desired MTV.

Advantageously, the control system is configured to regulate the actual MTV according to a method as defined by any one of preceding statements of invention.

Advantageously, the sensor is configured to sense a torque value within the rotary drive mechanism.

The baler may include a sensor that senses a force value, a sensor that senses the cyclical position of a component of the rotary drive mechanism, wherein the control system is configured to derive the actual MTV from the measured force value and the sensed cyclical position.

Advantageously, the square baler includes a sensor that senses a drive force between rotary drive mechanism and the plunger, or between rotary drive mechanism and a frame of the baler, wherein the control system is configured to determine the actual MTV from the sensed drive force.

Advantageously, the sensor senses the cyclical position of an output drive shaft of the rotary drive mechanism.

Advantageously, the adjustable friction control element comprises an adjustable panel of the bale-forming channel.

Advantageously, the square baler includes an actuator for adjusting a bias force applied to the adjustable panel.

An embodiment of the invention will now be described by way of example with reference to the accompanying drawings, wherein.

Figure 1:
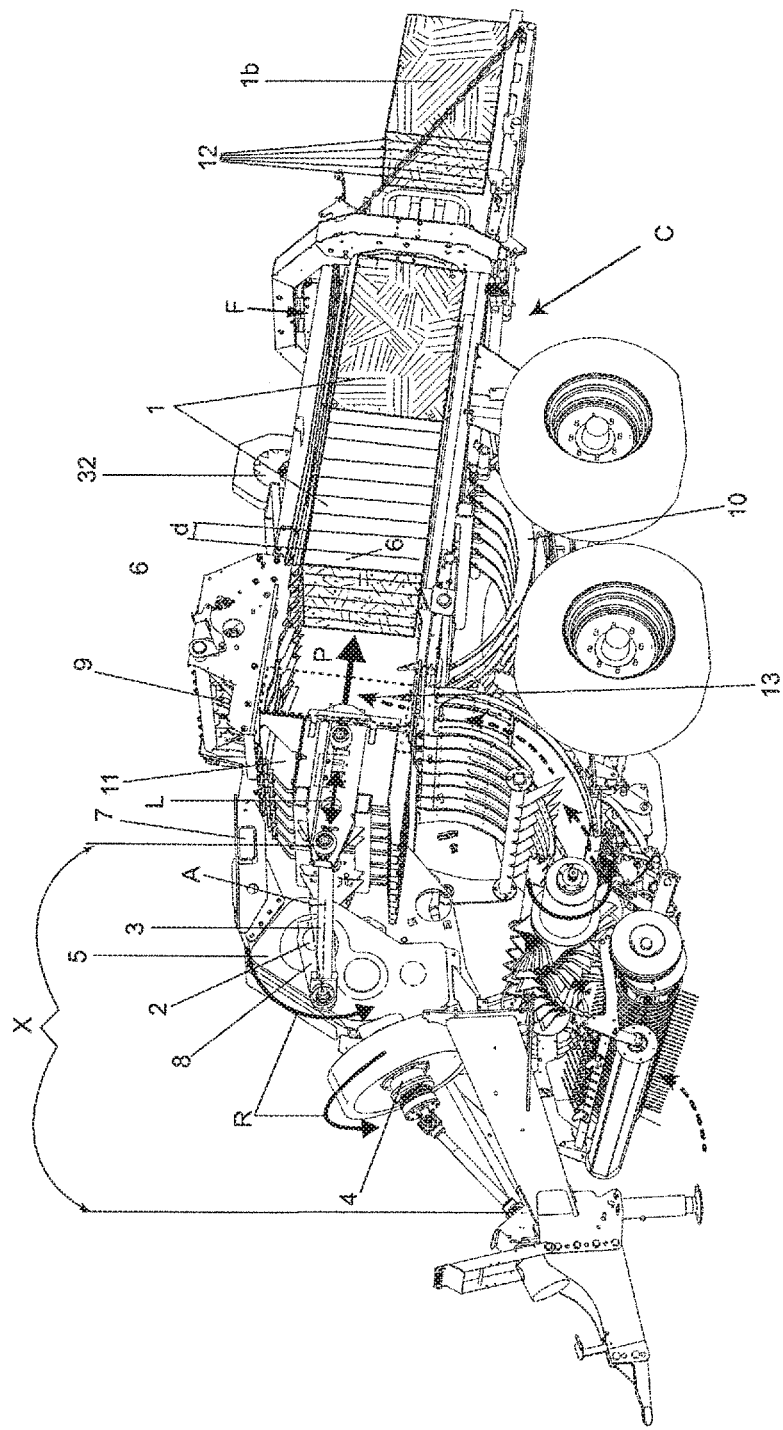
FIG. 1 is an isometric view showing the main components of a baling machine according to an embodiment of the invention.
Figure 2:
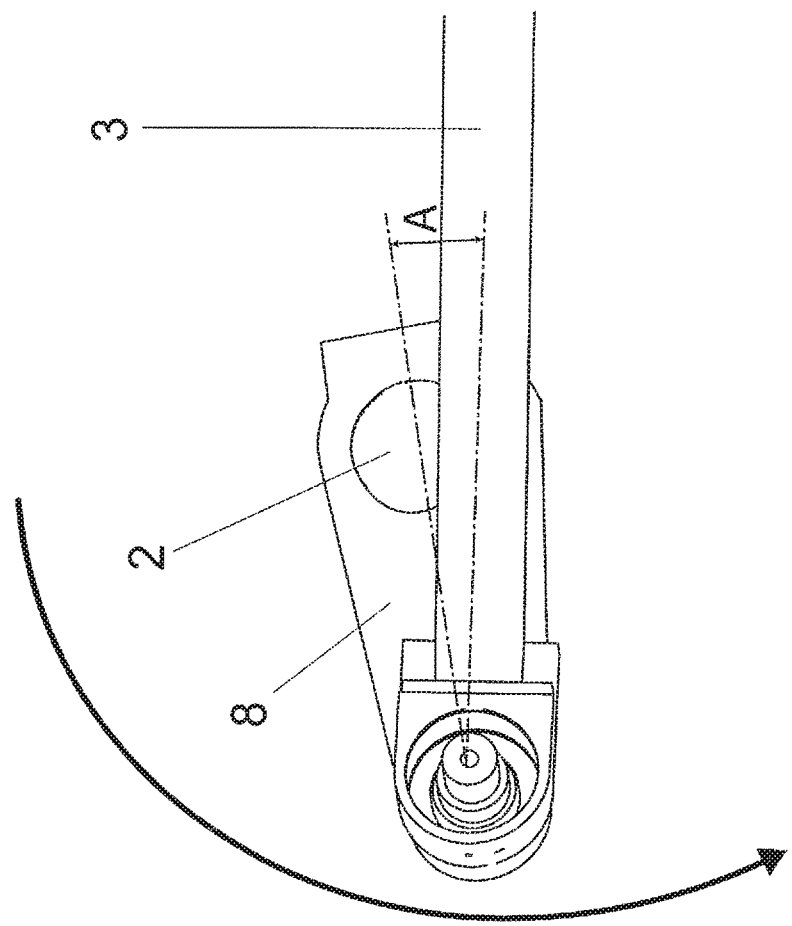
FIG. 2 is an isometric view showing part of a drive mechanism for the baling machine.

The baling machine or baler shown in FIG. 1 includes a baling chamber C and a plunger D that can be driven into the baling chamber C in a reciprocating manner. The baling machine also includes a pick up mechanism M for picking up cut bale material such as grass and straw from the ground, a feed mechanism N for feeding the bale material into the baling chamber C and a driveline X for transmitting drive to the plunger D from the drive output of a towing vehicle (not shown). These components are all conventional and may for example be as described in U.S. Pat. Nos. 4,074,623 and 4,142,746. The baling machine also includes a binding device E for binding the bale with binding twine. This binding device may for example be as described in U.S. Pat. No. 4,074,623.

The baling chamber C comprises an open ended bale-forming channel through which bale material 1 is forced by the reciprocating plunger D. In this example, the plunger D is driven from a rotating drive axle 2 via a crank 8 and the plunger rod 3. The drive axle 2 comprises an output shaft of a drive gearbox 5 that also has a drive input shaft 4 through which it receives drive from the drive output of a towing vehicle (not shown). The gearbox 5 is mounted on a frame 7 of the baling machine.

The open ended channel that forms the baling chamber C has an inlet end 13 and an outlet end 14. The bale-forming channel is defined by two side panels 15 (one of which has been omitted in FIG. 1 to show the interior of the baling chamber C), a top panel 16 and a bottom panel 17. The top panel 16 (and/or one or both of the side panels 15) comprises an adjustable panel that is pivotable about its upstream end allowing the cross-sectional area of the bale-forming channel to be adjusted. An adjusting mechanism 18 for adjusting the positions of the adjustable panel is provided towards the outlet end 14 of the baling chamber C. The adjusting mechanism 18 applies a biasing force F to the adjustable panel 16, to control the level of friction between the panel and the compressed material 1 in the baling chamber C. The adjustable panel 16 thus comprises a friction control element.

The plunger D is driven in a substantially linear direction L between two end positions comprising respectively a withdrawn position in front of the baling chamber C and an extended position in which it extends into the channel of the baling chamber C. When the plunger is in the withdrawn position the baling chamber C is loaded with the bale material to be compressed. The plunger D is then driven into the baling chamber so that this new material is compressed against a body of compressed material 1 already in the baling chamber C. The newly compacted material forms a wad W that is added to the already compacted material 1 in the channel. The friction of the compressed material 1 with the panels 15, 16, 17 of the baling chamber C provides a resistive force allowing for compression of the new material that is introduced into the baling chamber C in front of the plunger D.

After compression, the wad W of newly compressed material and the compressed material 1 already in the baling chamber C are moved together towards the outlet end 14 of the baling chamber until the plunger D reaches its fully extended end position. The plunger D then moves in the opposite direction towards its withdrawn position so that the baling chamber C can be reloaded with new material to be compressed. The friction within the baling chamber C between the compressed material 1 and the panels 15, 16, 17 of the chamber C can be regulated by pressing the adjustable panel 16 of the baling chamber against the compressed material 1 with different levels of force F.

The bale 1b formed from the compressed material is held in compression after leaving the machine by twines 19 that are looped around the body of compressed material. This binding process can be performed as follows.

At the start of the baling process two lengths of twine from spools (not shown) on opposite sides of the baling chamber C are connected to one another by tying the ends of the twines together using the knotter device E. As the bale material is compacted in the baling chamber C the spools feed twine to the baling chamber C on either side of the bale material. On one side of the baling chamber C the twine passes through the tip of a baling needle 20. When the body of compressed bale material 1 has reached its full length, between two successive compressing strokes, the needle 20 brings the twine as a loop to the other side of the baling chamber C. The knotter device E then knots the twine, joining an end of the twine loop that was brought around the compressed bale by the needle 20 to an end of the twine that was supplied by the spool on other side of the baling chamber (the same side as the knotter device E). The needle 20 is then retracted and a new bale is started.

Figure 3:
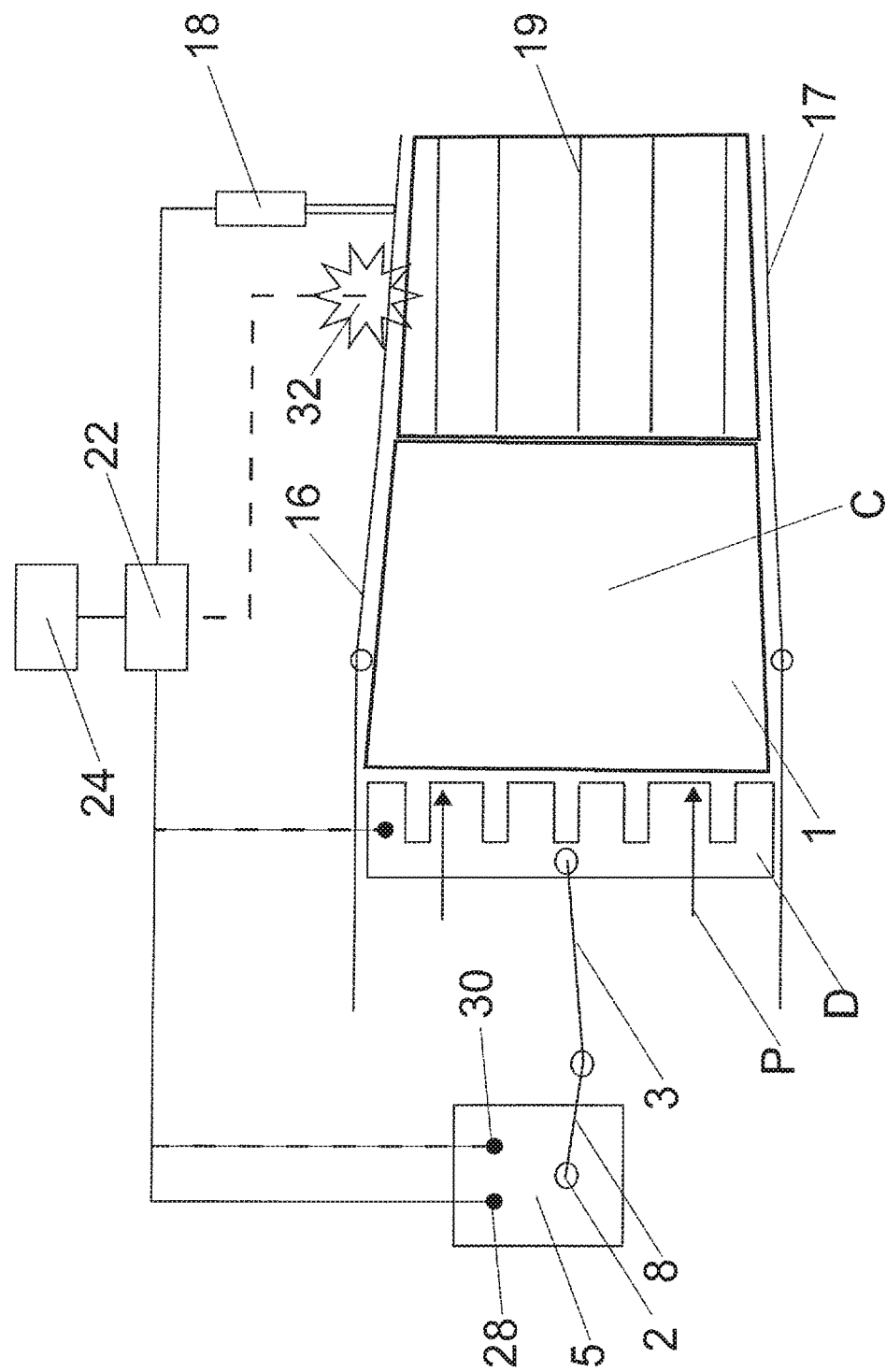
FIG. 3 is a schematic diagram illustrating a control system for the baling machine.

A control system for the baling machine is illustrated in FIG. 3. In this example, the control system includes an electronic control unit 22 that is linked to an operator input/output device 24, for example a touch sensitive display unit. The control unit 22 is connected to the adjusting mechanism 18 for adjusting the adjustable panel 16 of the baling chamber C and is configured to send control signals to the adjusting mechanism 18 to control the bias force F applied to the adjustable panel 16.

The control system is configured to determine an actual maximum torque value (MTV) associated with the rotary drive mechanism, to compare the actual MTV with a selected desired MTV and to adjust the bias force F applied to the adjustable panel 16 to regulate the actual MTV according to the desired MTV. The actual MTV is preferably regulated so as not to exceed the desired MTV and more preferably is matched to the desired MTV.

The actual maximum torque value (MTV) associated with the rotary drive mechanism may be determined in a number of different ways. In one embodiment the control unit is connected to a torque sensor 26 and is configured to receive from the sensor 26 a signal that represents a measured torque value in the rotary drive mechanism for the plunger D. The torque sensor 26 may for example be connected to the output shaft 2 or the input shaft 4 of the gearbox 5. The control unit monitors the measured torque value and from this determines the actual MTV.

In another embodiment of the invention, the control unit 22 is connected to a force sensor 28 associated with the plunger D and a position sensor 30 associated with the output shaft 2 of the gearbox 5. In this embodiment, the control unit 22 receives signals from both sensors and determines the torque value R by calculation, based on signals received from the sensors 28, representing the plunger force P and the angular position of the crank 8. The actual maximum torque value (MTV) is determined by identifying the maximum value of the calculated torque value R.

In another embodiment of the invention, the control unit 22 is connected to a force sensor 28 associated with the plunger D and to a travel sensor 32 that senses the distance travelled by the body 1 of compressed material during a compression stroke (the travel distance being generally equal to the wad thickness d). The travel sensor 32 may for example consist of a conventional star wheel device of the type that is often provided for activating the knotter E when the body of compressed material reaches the correct length for binding. As the angular position of the crank 8 at the maximum torque value can be determined from the travel distance, the control unit 22 can determine the MTV by calculation, based on signals received from the sensors 28, 32 representing the plunger force P and the travel distance (wad thickness d).

In any of the above embodiments of the invention the actual MTV may be regulated so as not to exceed the desired MTV. This reduces the risk of causing damage to the drive line X through excessive torque values. Preferably, the actual MTV is matched to the desired MTV so as to reduce any difference between the actual MTV and the desired MTV. This allows the maximum torque of the drive line to be utilized to provide a high level of compression.

In any of the above embodiments of the invention the actual MTV may be regulated by adjusting the bias force F applied to the adjustable panel 16. The bias force F may be regulated according to the maximum torque value MTV associated with the rotary drive mechanism. The bias force F may be adjusted continuously and proportionally to the MTV, or it may be adjusted in discrete steps.

In any of the above embodiments, the desired MTV may be selected by an operator according to the desired level of compression required for the bale material. Alternatively or in addition, the desired MTV may be selected or modified automatically according to accumulated torque values acquired over an extended period of time in order to guarantee a minimum service lifetime of the drive line X. For example, if the operator frequently selects a very high desired MTV, the control system may automatically reduce this selected MTV to avoid excessive wear on the drive line and its planned service lifetime.

In any of the above embodiments, the actual MTV may be used to provide a direct input for regulating the bias force F applied to the adjustable panel 16. Alternatively, it may be used to provide an indirect input, for instance by adjusting the maximum allowable plunger force value, when using conventional plunger force regulation, which varies according to the crank position at maximum plunger force. The crank position at maximum plunger force may be calculated from the wad thickness d and by assuming that the maximum plunger force will occur at the start of movement of the material in the baling chamber C.

A practical advantage of the invention is that the operator can choose either (i) a high throughput for the baling machine, which will produce large loads for the plunger, thick wads and a low plunger force, so resulting in a lower density for the bale, or (ii) a reduced throughput for the baling machine producing reduced loads on the plunger and thinner wads, and resulting in higher plunger forces and a higher density of the bales.

In order to obtain reduced loads for the plunger at the same forward driving speed of the machine, the input speed of the gearbox may be increased by providing an additional overdrive line. Advantageously the operator may then choose to drive the machine either directly at the original input of the gearbox and at the original speed, or indirectly via the overdrive line at the overdrive speed.

We claim:

1. A baler, comprising:
    a baling chamber that includes a bale-forming channel including at least one adjustable friction control element;
    a plunger mounted within the channel;
    a rotary drive mechanism to drive reciprocating movement of the plunger;
    a control system to control operation of the baler, the control system being configured to determine an actual maximum torque value (MTV) associated with the rotary drive mechanism, to compare the actual MTV with a selected desired MTV, and to adjust the at least one adjustable friction control element to regulate the actual MTV according to the selected desired MTV;
    a first sensor that senses a force value; and
    at least one second sensor that senses a cyclical position of a component of the rotary drive mechanism,
    wherein the control system is further configured to determine the actual MTV by measuring the force value, sensing the cyclical position of the component of the rotary drive mechanism, and deriving the actual MTV from the measured force value and the sensed cyclical position.

2. The baler according to claim 1, wherein the first sensor senses a drive force between the rotary drive mechanism and the plunger, or between the rotary drive mechanism and a frame of the baler, and
    wherein the control system is further configured to determine the actual MTV from the sensed drive force.

3. The baler according to claim 2, with wherein the at least one second sensor senses a cyclical position of an output drive shaft of the rotary drive mechanism.

4. The baler according to claim 1, wherein the at least one adjustable friction control element comprises an adjustable panel of the bale-forming channel.

5. The baler according to claim 4, further comprising an actuator configured to adjust a bias force applied to the adjustable panel.

6. The baler according to claim 1, wherein the rotary drive mechanism includes a selectable overdrive line configured to increase a rotational speed of the rotary drive mechanism.

* * * * *